(12) United States Patent
Buisine

(10) Patent No.: US 10,122,048 B2
(45) Date of Patent: Nov. 6, 2018

(54) METHOD FOR PREPARING BIS(FLUOROSULFONYL)IMIDE ACID AND SALTS THEREOF

(71) Applicant: RHODIA OPERATIONS, Paris (FR)

(72) Inventor: Olivier Buisine, Saint Genis-Laval (FR)

(73) Assignee: RHODIA OPERATIONS, Paris (FR)

( * ) Notice: Subject to any disclaimer, the term of this patent is extended or adjusted under 35 U.S.C. 154(b) by 36 days.

(21) Appl. No.: 15/101,149

(22) PCT Filed: Dec. 3, 2014

(86) PCT No.: PCT/EP2014/076388
§ 371 (c)(1),
(2) Date: Jun. 2, 2016

(87) PCT Pub. No.: WO2015/082532
PCT Pub. Date: Jun. 11, 2015

(65) Prior Publication Data
US 2016/0308247 A1   Oct. 20, 2016

(30) Foreign Application Priority Data
Dec. 5, 2013 (FR) .................................... 13 62137

(51) Int. Cl.
*H01M 10/0568* (2010.01)
*C01B 21/093* (2006.01)
*C01B 21/086* (2006.01)

(52) U.S. Cl.
CPC ....... *H01M 10/0568* (2013.01); *C01B 21/086* (2013.01); *C01B 21/093* (2013.01); *C01B 21/0935* (2013.01); *H01M 2300/0025* (2013.01)

(58) Field of Classification Search
CPC ...... H01M 10/0568; H01M 2300/0025; C01B 21/093; C01B 21/086; C01B 21/0935
See application file for complete search history.

(56) References Cited

U.S. PATENT DOCUMENTS

| 4,057,584 A | * | 11/1977 | Touzuka | B01J 37/26 502/231 |
| 8,134,027 B2 | * | 3/2012 | Okumura | C07C 303/40 564/83 |
| 2004/0097757 A1 | | 5/2004 | Cernik et al. | |
| 2010/0076221 A1 | | 3/2010 | Besson | |
| 2012/0020867 A1 | | 1/2012 | Morinaka et al. | |
| 2014/0075746 A1 | | 3/2014 | Schmidt | |

FOREIGN PATENT DOCUMENTS

| CN | 101516836 A | 8/2009 |
| EP | 2 415 757 A1 | 2/2012 |
| WO | 02/053494 A1 | 7/2002 |
| WO | 2012/160280 A2 | 11/2012 |

OTHER PUBLICATIONS

Martin Beran et al: "A New Method of the Preparation of Imido-bis(sulfuric acid) Dihalogenide, (F,Cl), and the Potassium Salt of Imido-bis(sulfuric acid) Difluoride", ZAAC (Journal for Inorganic and General Chemistry), vol. 631, No. 1, Jan. 1, 2005, pp. 55-59, WILEY-VCH.

* cited by examiner

Primary Examiner — Anthony J Zimmer

(57) ABSTRACT

The invention relates to a method for preparing bis(fluorosulfonyl)imide acid, comprising: the reaction of sulphamic acid or one of the salts thereof with a halogenosulfuric acid and at least one fluorinating agent selected from $SOF_2$, $F-SO_2-F$ and $SF_4$, and the subsequent recovery of bis(fluorosulfonyl)imide acid. The invention also relates to a method for producing salts of bis(fluorosulfonyl)imide from the bis(fluorosulfonyl)imide acid thus produced.

15 Claims, No Drawings

METHOD FOR PREPARING BIS(FLUOROSULFONYL)IMIDE ACID AND SALTS THEREOF

This application is a U.S. national phase entry under 35 U.S.C. § 371 of International Application No. PCT/EP2014/076388, filed on Dec. 3, 2014, which claims priority to French Application No. 1362137, filed on Dec. 5, 2013. The entire contents of these applications are explicitly incorporated herein by this reference.

A subject of the present invention is a process for preparing bis(fluorosulfonyl)imide acid (HFSI) and salts thereof, in particular lithium bis(fluorosulfonyl)imide LiFSI.

The production of HFSI and of LiFSI is widely described in the literature. Among the various technologies described, the majority use a fluorination reaction either with HF or with metal fluorides. The use of metal fluorides is problematic since it is often not very efficient and uses expensive reagents such as fluorosulfuric acid. For example, fluorination with potassium fluoride in nitromethane or other polar organic solvents is not very efficient in terms of yield (WO 2002/053494). Other technologies have been developed, for example using chlorosulfonyl isocyanate in the presence of oleum and of ammonium fluoride (JP 2012-162470) or else using urea and fluorosulfonic acid, but these technologies suffer because of the strong corrosion of the medium and also the exothermicity of the reaction. These drawbacks make these technologies poorly suited to industrial production of bis(fluorosulfonyl)imide acid (HFSI) and of salts thereof. The scientific publication by Beran and Prihoda (Z. Anorg. Allg. Chem., 2005, 631, 55-59) also describes methods for preparing bisfluorosulfonimide acid and salts thereof. However, the synthesis routes proposed involve the use of thionyl chloride, then the conversion of the chlorinated compound obtained into a fluorinated compound.

Thus, there is a great need to produce bis(fluorosulfonyl) imide acid (HFSI) and salts thereof according to an alternative process which remedies the drawbacks mentioned above. Surprisingly, the applicant has developed a novel process for producing bis(fluorosulfonyl)imide acid (HFSI) and salts thereof which operates under mild conditions and without exothermicity. The process according to the present invention has the advantage of being able to be easily carried out on an industrial scale.

A subject of the present invention is a process for preparing bis(fluorosulfonyl)imide acid of formula F—$SO_2$—NH—$SO_2$—F (HFSI), comprising the reaction of sulfamic acid or a salt thereof with at least one halosulfuric acid and at least one fluorinating agent selected from sulfonyl fluoride ($SOF_2$), sulfuryl fluoride (F—$SO_2$—F) and sulfur tetrafluoride ($SF_4$), then the recovery of the bis(fluorosulfonyl)imide acid.

In accordance with the process of the invention, the halosulfuric acid has the formula X—$SO_2$—OH where X is a halogen selected from fluorine, chlorine, bromine and iodine.

Preferably, said halogen is fluorine (fluorosulfuric acid) or chlorine (chlorosulfuric acid). The sulfamic acid or a salt thereof has the general formula $M_1$O—$SO_2$—$NH_2$, where $M_1$=H, an alkali metal or an alkaline-earth metal. Advantageously, said fluorinating agent is sulfuryl fluoride (F—$SO_2$—F). The reaction carried out in the process of the invention is advantageously carried out in the presence of a solvent, preferentially an organic solvent. Said solvent is, for example, a linear or branched aliphatic hydrocarbon or an aromatic hydrocarbon, for example toluene, xylene, chlorobenzene, dichlorobenzene or nitrobenzene. Preferably, dichlorobenzene is used.

In accordance with the process of the invention, said fluorinating agent advantageously represents from 1 to 10, preferably from 2 to 5 molar equivalent(s) expressed relative to the sulfamic acid or salts thereof. When the reaction according to the process of the invention is carried out in the presence of a solvent, said solvent advantageously represents from 10% to 90% by weight of the weight of the reaction mixture, which comprises all the reagents and the solvent.

According to one embodiment of the process of the invention consisting in using sulfuryl fluoride ($SO_2F_2$) as fluorinating agent, the halosulfuric acid advantageously represents from 1 mol % to 5 molar equivalents expressed relative to the sulfamic acid or salts thereof, preferably from 5 mol % to 1 mol equivalent expressed relative to the sulfamic acid or salts thereof. Advantageously, when the fluorinating agent used is sulfuryl fluoride, the halosulfuric acid can be used in a catalytic amount, preferably less than 1 molar equivalent. This embodiment is preferred since it makes it possible to limit the amount of halosulfuric acid to be introduced for carrying out the process of the invention.

According to another embodiment of the process of the invention consisting in using sulfonyl fluoride ($SOF_2$) or sulfur tetrafluoride ($SF_4$) as fluorinating agent, the halosulfuric acid represents from 1 to 5, preferably from 1 to 2 molar equivalent(s) expressed relative to the sulfamic acid or salts thereof.

The reaction carried out according to the process of the invention is performed at a temperature preferentially between 0° C. and 180° C., very preferentially between 80 and 150° C. It is advantageously carried out at a pressure ranging between 1 and 100 bar, it is preferably carried out under autogenous pressure.

The process for preparing HFSI according to the invention is simple to carry out.

The reagents can be introduced in any order according to different variants, but some are preferred.

One preferred embodiment consists in mixing the sulfamic acid or salts thereof, optionally present in said solvent, and the halosulfuric acid and then in introducing said fluorinating agent. Said fluorinating agent is introduced either in gas form, generally at atmospheric pressure and/or at ambient temperature, or in liquid form, generally under pressure and/or at low temperature. The reaction mixture is brought, with stirring, to the chosen reaction temperature in the time interval as previously defined. The heating of the reaction mixture is maintained for a variable period for example for a period ranging from 1 hour to 48 hours and preferentially ranging from 3 to 12 hours. It is further advantageous to introduce said fluorinating agent once the medium has been brought to the reaction temperature.

After the reaction medium has been maintained, with stirring, at the chosen temperature, the bis(fluorosulfonyl) imide acid is obtained at the end of the reaction. The reaction medium obtained at the end of the reaction is brought back to atmospheric pressure where appropriate. The volatile products present in said medium, generally HF, $SO_3$ and possibly the excess fluorinating reagent, are evaporated off.

Said bis(fluorosulfonyl)imide acid is then recovered using various techniques known in themselves to those skilled in the art.

A first embodiment consists in recovering the bis(fluorosulfonyl)imide acid by distillation. The reaction medium resulting from the reaction and devoid of the volatile products is subjected to a distillation, preferably under reduced pressure, at a temperature preferentially between 100 and 250° C., and at a pressure preferentially between 0.5 and 10 bar. The HFSI is recovered in liquid form.

A second embodiment consists in recovering the bis(fluorosulfonyl)imide acid by sublimation. The reaction medium resulting from the reaction and devoid of the volatile products is subjected to a treatment by sublimation at a temperature preferentially between 50 and 250° C., very preferentially between 80 and 140° C., and at a pressure preferentially between 1 mbar and 1 bar, very preferentially between 10 mbar and 500 mbar. The HFSI is recovered in solid form.

A third embodiment consists simply in maintaining the bis(fluorosulfonyl)imide acid in the reaction mixture resulting from the reaction and devoid of the volatile products while bringing said medium back to atmospheric pressure and to a temperature below 160° C., preferably between 20 and 80° C. The bis(fluorosulfonyl)imide acid can thus be directly used, in the subsequent salification step, in solution or suspension in the solvent in which said reaction was carried out.

A fourth embodiment consists in recovering the bis(fluorosulfonyl)imide acid by extraction with a solvent. The solvent can be selected from organic solvents. Said solvent can be, for example, a linear or branched aliphatic hydrocarbon or a halogenated aliphatic hydrocarbon, such as dichloromethane or dichloroethane. Preferably, dichloroethane can be used.

The process of the invention is advantageously carried out in equipment capable of withstanding the corrosion of the reaction medium.

For this purpose, materials are selected for the part in contact with the reaction medium that are corrosion-resistant, such as the alloys based on molybdenum, chromium, cobalt, iron, copper, manganese, titanium, zirconium, aluminum, carbon and tungsten, sold under the Hastelloy® brands or the alloys of nickel, chromium, iron and manganese to which copper and/or molybdenum are added, sold under the name Inconel® or Monel™, and more particularly the Hastelloy C 276 or Inconel 600, 625 or 718 alloys. Stainless steels may also be selected, such as austenitic steels [Robert H. Perry et al., *Perry's Chemical Engineers' Handbook, Sixth Edition* (1984), pages 23-44] and more particularly the 304, 304 L, 316 or 316 L stainless steels. A steel having a nickel content of at most 22% by weight, preferably of between 6% and 20% and more preferentially of between 8% and 14%, is used. The 304 and 304 L steels have a nickel content that varies between 8% and 12%, and the 316 and 316 L steels have a nickel content that varies between 10% and 14%. More particularly, 316 L steels are chosen.

Use may also be made of equipment consisting of or coated with a polymeric compound resistant to the corrosion of the reaction medium. Mention may in particular be made of materials such as PTFE (polytetrafluoroethylene or Teflon) or PFA (perfluoroalkyl resins). It will not be outside the scope of the invention to use an equivalent material.

As other materials capable of being suitable for being in contact with the reaction medium, mention may also be made of graphite derivatives.

The process for preparing HFSI according to the invention can be carried out continuously, batchwise or semi-continuously.

It is generally preferred to have HFSI salts since they more readily find an application than HFSI itself. Thus, another subject of the invention is a process for preparing at least one bis(fluorosulfonyl)imide salt using the process for preparing bis(fluorosulfonyl)imide acid as described above. Said bis(fluorosulfonyl)imide salt has the general formula $F-SO_2-N-M-SO_2-F$, where M represents an alkali metal (Li, Na, K, Rb, Cs), an alkaline-earth metal, a transition metal or a metal selected from lanthanides. Preferably, M is an alkali metal, in particular lithium: the resulting salt is lithium bis(fluorosulfonyl)imide (LiFSI). The process for preparing at least one bis(fluorosulfonyl)imide salt according to the invention consists in bringing the bis(fluorosulfonyl)imide acid prepared according to the process described above into contact with at least one salification agent. The salification agent is, for example, a metal hydroxide, a metal halide, a metal hydride, a metal trifluoroacetate or a metal trifluoromethanesulfonate. The metal present in said metal hydroxide, said metal halide, said metal hydride, said metal trifluoroacetate or said metal trifluoromethanesulfonate is preferentially selected from alkali metals, alkaline-earth metals, transition metals or metals selected from lanthanides. The stoichiometry of this salification step is such that from 1 to 5, preferably from 1 to 2, molar equivalents of salification agent are used relative to the bis(fluorosulfonyl)imide acid. Said process for preparing at least one bis(fluorosulfonyl)imide salt according to the invention is performed in the presence or in the absence of a solvent, preferentially in the presence of a solvent. The solvent is, for example, water or an organic solvent selected from linear or branched aliphatic hydrocarbons, aromatic hydrocarbons (toluene, xylene, chlorobenzene, dichlorobenzene), nitrile compounds (acetonitrile, butyronitrile, valeronitrile, adiponitrile) and alkyl carbonates (ethylene carbonate, propylene carbonate, dimethyl carbonate, diethyl carbonate). Said solvent can represent up to 90% by weight, preferably from 10% to 80% by weight of the weight of the reaction mixture, which comprises all the reagents and the solvent.

The process for preparing a bis(fluorosulfonyl)imide salt according to the invention is performed at a temperature preferentially below 100° C., very preferentially between 20 and 50° C. Said process is preferentially carried out at atmospheric pressure.

The process for preparing a bis(fluorosulfonyl)imide salt according to the invention is simple to carry out. The HFSI is added to the salification agent or vice versa. Either can be in the pure state, while at least one of these two reagents is preferentially present in a solvent.

The bis(fluorosulfonyl)imide salt is isolated by filtration or evaporation of the solvent.

The process for preparing bis(fluorosulfonyl)imide salts according to the invention can be carried out continuously, batchwise or semi-continuously.

The process for preparing bis(fluorosulfonyl)imide salts according to the invention also comprises a step of purifying said salt. This purification step can in particular consist of a recrystallization. The recrystallization solvent can be selected from oxygen-containing solvents, for example ethers or esters. Examples of ether solvents are tetrahydrofuran, dioxane and glymes.

The purification of a bis(fluorosulfonyl)imide salt by recrystallization can also be a subject of the present invention independently of the process for obtaining said salt.

Following the isolation and optionally the purification thereof, the bis (fluorosulfonyl) imide salt may be dried by conventional methods known to those skilled in the art, for example by conventional drying, by drying under reduced pressure, or by spray drying.

Another subject of the present invention is the use of the bis(fluorosulfonyl)imide salts prepared according to the process described above, as electrolyte salts, as antistatic agent precursors or else as surfactant precursors. In particular, said salts are advantageously used as electrolytes for the manufacture of batteries, and in the field of electrochromism and electronics. They are advantageously used as antistatic agents for the manufacture of pressure-sensitive adhesives (PSAs). As antistatic agents, they may also be used as components of lubricants. They are used in optical materials such as electroluminescent devices and are incorporated into the composition of photovoltaic panels.

An exemplary embodiment of the invention is given hereinafter. This example is given by way of nonlimiting illustration.

EXAMPLE 1

A solution of sulfamic acid (22.4 g; 230 mmol) in 30 grams of ortho-dichlorobenzene is charged to a 500 ml C276 Hastelloy reactor. Fluorosulfonic acid (1.2 g; 12 mmol) is added and the autoclave is closed. The medium is heated to a temperature of 92° C. The sulfuryl fluoride (47 g; 0.46 mol) is added in such a way as to maintain the pressure below P=37 bar. The addition is carried out over the course of 9 hours.

The temperature is then brought back to ambient temperature and the reactor is decompressed. An analysis of the reaction medium by fluorine 19 NMR shows that the expected bis(fluorosulfonyl)imide acid is formed with a yield of 52%.

EXAMPLE 2

A solution of sulfamic acid (22.4 g; 230 mmol) in 300 grams of dichloroethane is charged to a 500 ml C276 Hastelloy reactor. Fluorosulfonic acid (1.2 g; 12 mmol) is added and the autoclave is closed. The medium is heated to a temperature of 92° C. The sulfuryl fluoride (47 g; 0.46 mol) is added in such a way as to maintain the pressure below P=37 bar. The addition is carried out over the course of 10 hours.

The temperature is then brought back to ambient temperature and the reactor is decompressed. An analysis of the reaction medium by fluorine 19 NMR shows that the expected bis(fluorosulfonyl)imide acid is formed with a yield of 53%.

EXAMPLE 3

200 g of dichloroethane are charged to a 500 ml C276 Hastelloy reactor, which is then closed and left stirring at ambient temperature and purged with nitrogen. The thionyl fluoride (60 g; 0.34 mol) is then added under pressure to the reactor. The sulfamic acid (22.3 g; 0.23 mol) in solution in dichloroethane (100 g) and then the chlorosulfuric acid (26.8 g; 0.23 mol) are added to the autoclave. The temperature is then maintained at 80° C. for 17 hours. The pressure observed reaches 22 bar at the end of the reaction at this temperature. After returning to ambient temperature, the reactor is decompressed. The analysis of the medium by $^{19}F$ NMR indicates that the bis(fluorosulfonyl)imide acid is obtained with a yield of 77%.

EXAMPLE 4

The solution obtained in example 3, containing the bis(fluorosulfonyl)imide acid, is concentrated at ambient temperature under reduced pressure while maintaining the temperature of the medium below 80° C.

The residue obtained is distilled under reduced pressure (P=5 mbar) while maintaining the temperature of the boiler below 80° C.

Under an inert atmosphere, the bis(fluorosulfonyl)imide acid thus distilled is slowly added to a suspension of lithium hydride (1.15 g; 0.145 mol) in anhydrous butyl acetate (55 g). The solution is then cooled to −20° C. and the solid obtained is recovered by filtration.

The solid is purified a second time by recrystallization from butyl acetate.

The solid obtained is then rinsed with dichloromethane and dried under vacuum.

The lithium bis(fluorosulfonyl)imide obtained has a purity greater than 90% by weight.

The invention claimed is:

1. A process for preparing bis(fluorosulfonyl)imide acid of formula F—SO$_2$—NH—SO$_2$—F, the process comprising the reaction of sulfamic acid or a salt thereof with at least one halosulfuric acid and at least one fluorinating agent selected from the group consisting of SOF$_2$, F—SO$_2$—F and SF$_4$, then the recovery of the bis(fluorosulfonyl)imide acid.

2. The process for preparing bis(fluorosulfonyl)imide acid as claimed in claim 1, wherein the halosulfuric acid has the formula X—SO$_2$—OH wherein X is a halogen selected from the group consisting of fluorine, chlorine, bromine and iodine.

3. The process for preparing bis(fluorosulfonyl)imide acid as claimed in claim 1, wherein said reaction is carried out in the presence of an organic solvent.

4. The process for preparing bis(fluorosulfonyl)imide acid as claimed in claim 1, wherein the halosulfuric acid represents from 1 mol % to 5 molar equivalents expressed relative to the sulfamic acid or salts thereof and the fluorinating agent is F—SO$_2$—F.

5. The process for preparing bis(fluorosulfonyl)imide acid as claimed in claim 4, wherein the halosulfuric acid represents from 5 mol % to 1 molar equivalent expressed relative to the sulfamic acid or salts thereof.

6. The process for preparing bis(fluorosulfonyl)imide acid as claimed in claim 1, wherein the halosulfuric acid represents from 1 to 5 molar equivalent(s) expressed relative to the sulfamic acid or salts thereof and the fluorinating agent is SOF$_2$ or SF$_4$.

7. The process for preparing bis(fluorosulfonyl)imide acid as claimed in claim 1, wherein said fluorinating agent represents from 1 to 10 molar equivalent(s) expressed relative to the sulfamic acid or salts thereof.

8. The process for preparing bis(fluorosulfonyl)imide acid as claimed in claim 1, wherein said reaction is performed at a temperature between 0 and 180° C.

9. The process for preparing bis(fluorosulfonyl)imide acid as claimed in claim 1, wherein said bis(fluorosulfonyl)imide acid is recovered by distillation, by sublimation or by extraction.

10. A process for preparing at least one bis(fluorosulfonyl)imide salt, the process comprising preparing the bis(fluorosulfonyl)imide acid according to the process as defined in claim 1, followed by bringing said acid into contact with at least one salification agent.

11. The process for preparing at least one bis(fluorosulfonyl)imide salt as claimed in claim 10, wherein the salification agent is a metal hydroxide, a metal halide, a metal hydride, a metal trifluoroacetate or a metal trifluoromethanesulfonate.

12. The process for preparing at least one bis(fluorosulfonyl)imide salt as claimed in claim 10, wherein said salt has the general formula $F-SO_2-N\text{-}M\text{-}SO_2-F$, where M represents an alkali metal, an alkaline-earth metal, a transition metal or a metal selected from lanthanides.

13. The process for preparing at least one bis(fluorosulfonyl)imide salt as claimed in claim 10, wherein said salt is lithium bis(fluorosulfonyl)imide.

14. The process for preparing at least one bis(fluorosulfonyl)imide salt as claimed in claim 10, also comprising a step of purifying said salt.

15. The process for preparing at least one bis(fluorosulfonyl)imide salt as claimed in claim 14, wherein the purification step consists of a recrystallization.

* * * * *